(12) United States Patent
Klein et al.

(10) Patent No.: US 9,902,788 B2
(45) Date of Patent: Feb. 27, 2018

(54) AGENT FOR THE FORMATION OF CHANNELS IN AN ENTRAINED POLYMER, ENTRAINED POLYMER CONTAINING SUCH AN AGENT, PROCESS FOR PRODUCING SUCH AN ENTRAINED POLYMER AND PRODUCT CONTAINING THE SAME

(71) Applicants: Julien Klein, Brumath (FR); William Frederick Spano, Auburn, AL (US); Ralf Kibele, Bruckmuehl (DE)

(72) Inventors: Julien Klein, Brumath (FR); William Frederick Spano, Auburn, AL (US); Ralf Kibele, Bruckmuehl (DE)

(73) Assignee: CSP TECHNOLOGIES, INC., Auburn, AL (US)

( * ) Notice: Subject to any disclaimer, the term of this patent is extended or adjusted under 35 U.S.C. 154(b) by 798 days.

(21) Appl. No.: 14/211,703

(22) Filed: Mar. 14, 2014

(65) Prior Publication Data

US 2014/0287174 A1    Sep. 25, 2014

Related U.S. Application Data

(60) Provisional application No. 61/783,029, filed on Mar. 14, 2013.

(51) Int. Cl.
*B32B 27/32* (2006.01)
*C08F 110/06* (2006.01)
(Continued)

(52) U.S. Cl.
CPC ............ *C08F 110/06* (2013.01); *B32B 27/32* (2013.01); *C08L 23/12* (2013.01); *C08L 71/02* (2013.01);
(Continued)

(58) Field of Classification Search
CPC .... C08F 110/04; C08F 110/06; C08F 210/04; C08F 210/06; C08L 23/10; C08L 23/12;
(Continued)

(56) References Cited

U.S. PATENT DOCUMENTS 2,978,431 A * 4/1961 Eugle ..................... C08L 23/06
508/579
4,250,081 A * 2/1981 Bode ....................... C08K 3/34
524/450
(Continued)

FOREIGN PATENT DOCUMENTS

EP         0526117 A1 *  2/1993  ............... C08K 3/36

OTHER PUBLICATIONS

Ethylene-Vinyl Acetate Copolymer Product Stewardship Summary, Honeywell, Feb. 2011, p. 1, https://www51.honeywell.com/sm/common/documents/GPS0043_Public_Risk_Summary_-_Ethylene-Vinyl_Acetate.pdf.*

(Continued)

*Primary Examiner* — Lee E Sanderson
(74) *Attorney, Agent, or Firm* — David B. Gornish; Eckert Seamans Cherin & Mellott LLC (57) ABSTRACT

An entrained polymer includes a base polymer, an active agent, and a channeling agent. The active agent acts on, interacts or reacts with a selected material. The channeling agent is immiscible with the base polymer and is adapted to transmit a selected material through the entrained polymer at a faster rate than in solely the base polymer. The channeling agent is a water insoluble polymer.

14 Claims, 5 Drawing Sheets

(51) Int. Cl.
*C08L 23/12* (2006.01)
*C08L 71/02* (2006.01)

(52) U.S. Cl.
CPC .. *Y10T 428/1352* (2015.01); *Y10T 428/31938* (2015.04)

(58) Field of Classification Search
CPC ............ Y10T 428/13; Y10T 428/1307; Y10T 428/1334; Y10T 428/1355; Y10T 428/1359; Y10T 428/1379; Y10T 428/139; Y10T 428/1393; Y10T 428/1397; Y10T 428/1376; B01J 20/28; B01J 20/28014; B01J 20/28033; B01J 20/28042; B65D 81/264; F26B 21/083; B32B 27/32
USPC ........... 206/204; 252/194; 53/400; 428/34.1, 428/35.7, 36.5, 36.9, 36.91, 36.92, 304.4; 524/376
See application file for complete search history.

(56) References Cited

U.S. PATENT DOCUMENTS

| | | | |
|---|---|---|---|
| 4,741,779 A * | 5/1988 | Mita | C08K 3/36 106/467 |
| 5,891,376 A * | 4/1999 | Christie | A23B 7/148 264/234 |
| 5,911,937 A | 6/1999 | Hekal | |
| 6,080,350 A | 6/2000 | Hekal | |
| 6,124,006 A | 9/2000 | Hekal | |
| 6,130,263 A | 10/2000 | Hekal | |
| 6,194,079 B1 | 2/2001 | Hekal et al. | |
| 6,214,255 B1 | 4/2001 | Hekal | |
| 6,221,446 B1 * | 4/2001 | Hekal | B01J 20/28014 206/204 |
| 6,401,432 B1 * | 6/2002 | Hirano | B65D 81/266 53/400 |
| 6,486,231 B1 | 11/2002 | Hekal | |
| 7,005,459 B2 | 2/2006 | Hekal | |
| 2001/0018465 A1 * | 8/2001 | Yano | C08L 23/0815 521/134 |
| 2002/0071922 A1 * | 6/2002 | Bailey | B32B 7/10 428/35.3 |
| 2003/0129433 A1 * | 7/2003 | Hara | B32B 27/18 428/515 |
| 2012/0143163 A1 * | 6/2012 | Ng | A61F 13/4704 604/385.101 |

OTHER PUBLICATIONS

Asinger, Friedrich. Mono-Olefins: Chemistry and Technology. Oxford: Pergamon, 1968, p. 241.*
Ismail et al., Gas Separation Membranes Polymeric and Inorganic, Cham: Springer International, 2015, p. 32.*

* cited by examiner

AGENT FOR THE FORMATION OF CHANNELS IN AN ENTRAINED POLYMER, ENTRAINED POLYMER CONTAINING SUCH AN AGENT, PROCESS FOR PRODUCING SUCH AN ENTRAINED POLYMER AND PRODUCT CONTAINING THE SAME

CROSS-REFERENCE TO RELATED APPLICATIONS

This application claims the priority of U.S. Application Ser. No. 61/783,029 filed Mar. 14, 2013.

FIELD OF THE INVENTION

The invention pertains to channeling agents for entrained polymers, entrained polymers including such channeling agents, processes for producing entrained polymers, and products including such entrained polymers.

BACKGROUND

The use of channeling agents, such as polyethylene glycol (PEG) for channeling moisture, oxygen, or other materials, through polymers, is known, and has been described in, for example U.S. Pat. Nos. 5,911,937, 6,080,350, 6,124,006, 6,130,263, 6,194,079, 6,214,255, 6,486,231 and 7,005,459, each of which is incorporated herein by reference as if fully set forth. Such channeling agents may be incorporated into packaging by way of a polymeric sleeve, insert, or package formed of the polymer itself. The polymeric material containing the channeling agent is further entrained with an active agent, for example, an absorbing or releasing material. The channeling agent forms channels between the interior of package and the active agent located interior to the polymer, to transmit a selected material, which may be, for example a material absorbed or released by the absorbing or releasing material.

Such polymers can be useful, for example, in packaging of pharmaceuticals, nutraceuticals, medical devices, foodstuffs, electronics and tobacco products. The entrained polymer, and as a result, some of the channeling agent incorporated therein, will contact the packaged material in these types of applications. As a result, the use of a channeling agent that does not migrate into the packaged product is desirable, so as to avoid contact with or possible consumption of the channeling agent by the consumer. Such a channeling agent may be, for example, a water insoluble polymer, so that contact with moisture in the product does not cause extraction of the channeling agent.

SUMMARY

In one aspect, the present invention is directed to a base polymer, an active agent, and a channeling agent. The active agent acts on, interacts or reacts with a selected material. The channeling agent is immiscible with the base polymer and is adapted to transmit a selected material through the entrained polymer at a faster rate than in solely the base polymer. The channeling agent is a water insoluble polymer.

The present invention is further directed to a method of producing an entrained polymer as described above.

The present invention is further directed to a shaped article formed of the entrained polymer described above.

The present invention is still further directed to a container containing the shaped article described above.

DETAILED DESCRIPTION OF THE PREFERRED EMBODIMENTS

Detailed embodiments of the present invention are disclosed herein, but it should be understood that the disclosed embodiments are merely exemplary of the invention, which may be embodied in various forms. The figures are not necessarily to scale; some features may be exaggerated to show details of particular components. Therefore, specific structural and functional details disclosed herein are not to be interpreted as limiting, but merely as a basis for the claims and as a representative basis for teaching one skilled in the art to variously employ the present invention.

As used herein, the term "active" is defined as capable of acting on, interacting with or reacting with a selected material according to the invention. Examples of such actions or interactions may include absorption or release of the selected material.

As used herein, the term "active agent" is defined as a material that, when mixed and heated with the base polymer and the channeling agent, will not melt, i.e., has a melting point that is higher than the melting point for either the base polymer or the channeling agent, and (2) acts on, interacts or reacts with a selected material. The term "active agent" may include but is not limited to materials that absorb or release the selected material(s). Active agents according to the invention may be in the form of particles, but the invention should not be viewed as limited to particulate active agents.

By way of example, a base polymer having a gas transmission rate of the selected material may be a polymer having a water vapor transmission rate in embodiments where the selected material is moisture and the active agent is a water absorbing desiccant.

Referring to a comparison of the base polymer and channeling agent water vapor transmission rate, in one embodiment, the channeling agent has a water vapor transmission rate of at least two times that of the base polymer. In another embodiment, the channeling agent has a water vapor transmission rate of at least five times that of the base polymer. In another embodiment, the channeling agent has a water vapor transmission rate of at least ten times that of the base polymer. In still another embodiment, the channeling agent has a water vapor transmission rate of at least twenty times that of the base polymer. In still another embodiment, the channeling agent has a water vapor transmission rate of at least fifty times that of the base polymer. In still another embodiment, the channeling agent has a water vapor transmission rate of at least one hundred times that of the base polymer.

As used herein, the term "channeling agent" or "channeling agents" is defined as a material (1) that is immiscible with the base polymer, and (2) capable of forming channels through the entrained polymer when formed by mixing the channeling agent with the base polymer and (3) wherein such channels are capable of transmitting a selected material through the entrained polymer at a faster rate than in solely the base polymer.

As used herein, the term "channels" or "interconnecting channels" is defined passages formed of the channeling agent that penetrate through the base polymer and may be interconnected with each other.

As used herein, the term "entrained polymer" is defined as a monolithic material formed of at least a base polymer with an active agent and/or channeling agent entrained or distributed throughout.

As used herein, the term "melting point" is defined as the first order transition point of the material determined by differential scanning calorimetry (DSC).

As used herein, the term "monolithic," "monolithic structure" or "monolithic composition" is defined as a composition or material that does not consist of two or more discrete macroscopic layers or portions. Accordingly, a "monolithic composition" does not include a multi-layer composite.

As used herein, the term "phase" is defined as a portion or component of a monolithic structure or composition that is uniformly distributed throughout, to give the structure or composition it's monolithic characteristics.

As used herein, the term "selected material" is defined as a material that is acted upon by, or interacts or reacts with an active agent and is capable of being transmitted through the channels of the entrained polymer. For example, in embodiments in which a desiccant is used as an active agent, the selected material may be moisture or a gas that can be absorbed by the desiccant. In embodiments in which a releasing material is used as an active agent, the selected material may be an agent released by the releasing material, such as moisture, fragrance, or an antimicrobial agent.

As used herein, the term "three phase" is defined as a monolithic composition or structure comprising three or more phases. An example of a three phase composition according to the invention would be an entrained polymer formed of a base polymer, active agent, and channeling agent.

FIGS. 1-11 show schematic illustrations of entrained polymers 10 and various packaging assemblies formed of entrained polymers according to the invention. The entrained polymers 10 each include a base polymer 25, a channeling agent 35 and an active agent 30. As shown, the channeling agent 35 forms interconnecting channels 45 through the entrained polymer 10. At least some of the active agent 30 is contained within these channels 45, such that the channels 45 communicate between the active agent 30 and the exterior of the entrained polymer 10 via channel openings 48 formed at outer surfaces of the entrained polymer 25. The active agent 30 can be, for example, any one of a variety or absorbing or releasing materials, as described in further detail below.

The channeling agent 35 can be a polymer with a migration in compliance with United States Pharmacopeia Standard 661 regarding physiochemical tests to plastics and heavy metals and nonvolatile residue in polyethylene containers, it being understood that the tests outlined in this standard could be applied to containers made of materials in accordance with the invention. In another embodiment, the channeling agent 35 is a polymer with a migration in compliance with European Union Commission Regulation (EU) No. 10/2011 of Jan. 14, 2011 on plastic materials and articles intended to come into contact with food. In another embodiment, the channeling agent 35 is a polymer with a migration in compliance with Notification No. 20 of the Japanese Ministry of Welfare regarding food packaging and containers. The channeling agent 35 can be, for example, a water insoluble polymer, such as a propylene oxide polymerisate-monobutyl ether, such as Polyglykol B01/240, produced by CLARIANT. In other embodiments, the channeling agent could be a propylene oxide polymerisate monobutyl ether, such as Polyglykol B01/20, produced by CLARIANT, propylene oxide polymerisate, such as Polyglykol D01/240, produced by CLARIANT, ethylene vinyl acetate, nylon 6, nylon 66, or any combination of the foregoing.

Figure 11:
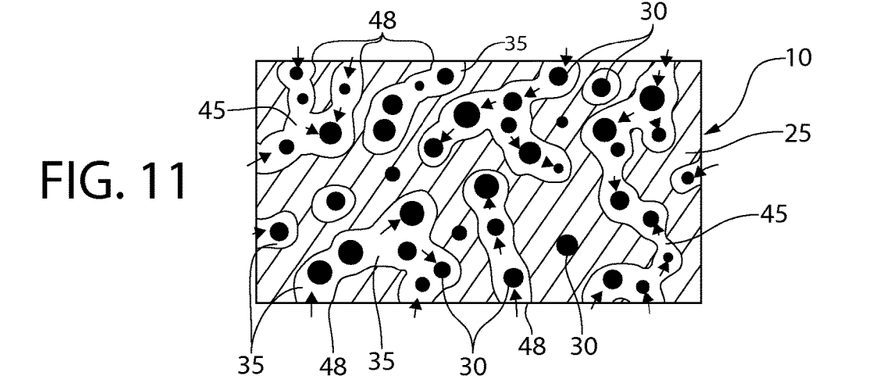
FIG. 11 is a schematic illustration of an entrained polymer according to the invention, in which the active agent is an absorbing material.

Suitable active agents according to the invention include absorbing materials, such as desiccating compounds. FIG. 11 illustrates an embodiment of an entrained polymer 10 according to the invention, in which the active agent 30 is an absorbing material. The arrows indicate the path of the selected material, for example moisture or gas, from an exterior of the entrained polymer 10, through the channels 45, to the particles of active agent 30, which absorb the selected material.

Various types of absorbing materials or desiccating compounds can be used as active agents in the entrained polymers of the invention. The first type of desiccating compounds, hereinafter referred to as "hydrate forming desiccants," comprises chemical compounds that can combine with water to form hydrates. Examples of hydrate forming desiccants are anhydrous salts which tend to absorb water or moisture and form a stable hydrate. In this reaction with the moisture, a stable compound is formed within which the moisture is held and prevented from release by chemical interaction.

The second type of desiccating compounds, hereinafter referred to as "reactive desiccants," are those which are considered to be reactive. These compounds typically undergo a chemical reaction with water or moisture and form new compounds within which the water is combined. These newly formed compounds are generally irreversible at low temperature and require a significant amount of energy to be regenerated so that they may be reused as desiccants. These reactive desiccants are mainly used in solvent drying and as active agents to polymers which must themselves be maintained in a moisture reduced state.

The third type of desiccating compounds, hereinafter referred to as "physical absorption desiccants," obtain their moisture absorbing capabilities through physical absorption. The absorption process is accomplished because of a fine capillary morphology of the desiccant particles, which pulls moisture therethrough. The pore size of the capillaries, as well as the capillaries' density, determine the absorption properties of the desiccant. Examples of these physical absorption desiccants include molecular sieve, silica gels, clays (e.g. montmorillimite clay), certain synthetic polymers (e.g. those used in baby diapers), and starches. Because these types of physical absorption desiccants are both inert and non-water soluble, they are preferred for many applications. Exemplary molecular sieve pore sizes that are suitable for use in the present invention include between about 3 to 15 Angstroms; about 3 to 5 Angstroms, about 5 to 8:3 Angstroms; 4 Angstroms; 5 Angstroms; 8 Angstroms and 10 Angstroms. In another exemplary embodiment, the pore size of silica gel is about 24 Angstroms. Among other reasons, these innocuous characteristics are particularly compatible with food products and medicinal products that may be enclosed within containers formed from the entrained polymers, or at least exposed thereto. As stated previously, however, any of the three types may be employed to form the entrained polymers of the present invention.

Suitable absorbing materials may also include: (1) metals and alloys such as, but not limited to, nickel, copper, aluminum, silicon, solder, silver, gold; (2) metal-plated particulates such as silver-plated copper, silver-placed nickel, silver-plated glass microspheres; (3) inorganics such as $BaTiO_3$, $SrTiO_3$, $SiO_2$, $Al_2O_3$, ZnO, $TiO_2$, MnO, CuO, $Sb_2O_3$, WC, fused silica, fumed silica, amorphous fused silica, sol-gel silica, sol-gel titanates, mixed titanates, ion exchange resins, lithium-containing ceramics, hollow glass microspheres; (4) carbon-based materials such as carbon, activated charcoal, carbon black, ketchem black, diamond powder; and (5) elastomers, such as polybutadiene, polysiloxane, and semi-metals, ceramic and; (6) other fillers and pigments.

In another example, the absorbing material may be calcium oxide. In the presence of moisture and carbon dioxide, the calcium oxide is converted to calcium carbonate. Accordingly, calcium oxide may be used as the absorbing material in applications where absorption of carbon dioxide is needed. Such applications include preserving fresh foods (e.g., fruits and vegetables) that give off carbon dioxide.

In one embodiment relating to the absorbing material having a relatively fine particle size, many small interconnecting channels throughout the entrained polymer are produced by the channeling agent, as opposed to a few large interconnecting channels that will expose less surface area within the polymer. Dimer agents such as polypropylene maleic anhydride, or any plasticizer, may be optionally added to the mixture to reduce viscosities and increase the mixing compatibility of the base polymer and channeling agent, thereby increasing the dispersion of the channels throughout the entrained polymer.

Figures 9, 10:
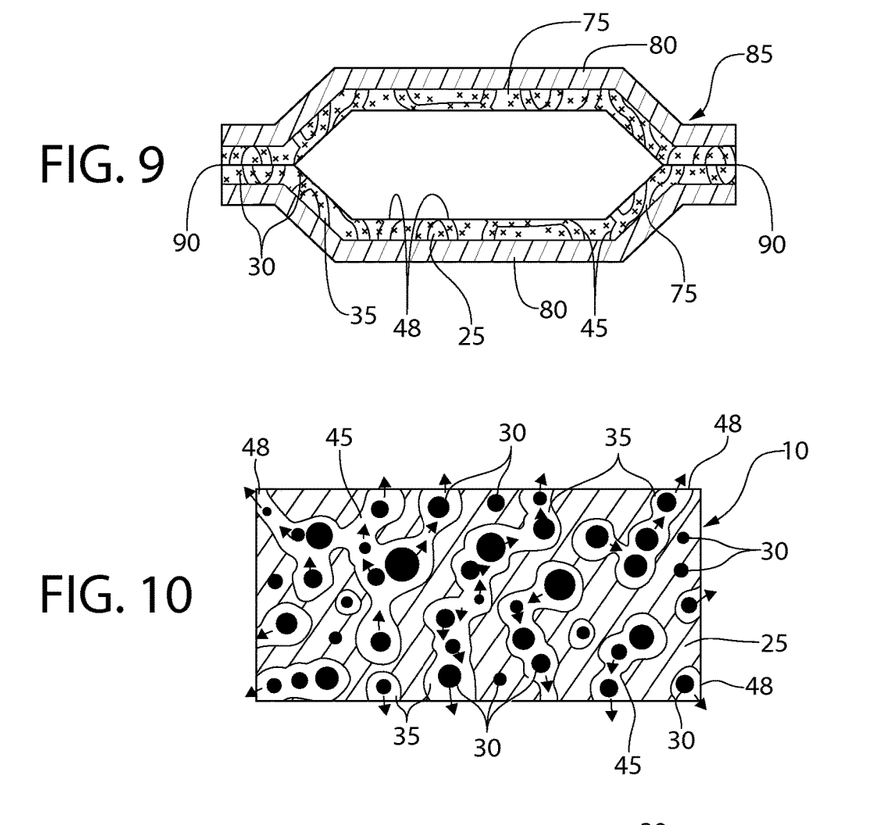
FIG. 9 is a cross section of an active package according to the invention.
FIG. 10 is a schematic illustration of an entrained polymer according to the invention, in which the active agent is a releasing material.

Other suitable active agents according to the invention include releasing materials. FIG. 10 illustrates an embodiment of an entrained polymer 10 according to the invention, in which the active agent 30 is a releasing material. The arrows indicate the path of the selected material, for example fragrance, from the particles of active agent 10, through the channels 45, to an exterior of the entrained polymer 10.

A variety of releasing materials could be employed as active agents in the entrained polymers of the present invention. Such materials may comprise any suitable material that will release the selected material from the releasing material. The selected material released from the releasing material could be in the form of a solid, gel, liquid or gas. These substances can perform a variety of functions including: serving as a fragrance, flavor, or perfume source; supplying a biologically active ingredient such as pesticide, pest repellent, antimicrobials, bait, aromatic medicines, etc.; providing humidifying or desiccating substances; delivering air-borne active chemicals, such as corrosion inhibitors; ripening agents and odor-making agents.

Suitable biocides for use as releasing materials in the entrained polymers of the present invention may include, but are not limited to, pesticides, herbicides, nematacides, fungicides, rodenticides and/or mixtures thereof. In addition to the biocides, the covering of the present invention can also release nutrients, plant growth regulators, pheromones, defoliants and/or mixture thereof.

Quaternary ammonium compounds can also be used as releasing materials according to the invention. Such compounds not only function as surfactants, but also impart to the surface of the entrained polymer aseptic properties or establish conditions for reducing the number of microbial organisms, some of which can be pathogenic. Numerous other antimicrobial agents, such as benzalkonium chloride and related types of compounds as hexachlorophene, may also be used as releasing agents according to the invention.

Other potential releasing materials include fragrances, including natural, essential oils and synthetic perfumes, and blends thereof. Typical perfumery materials which may form part of, or possibly the whole of, the active ingredient include: natural essential oils such as lemon oil, mandarin oil, clove leaf oil, petitgrain oil, cedar wood oil, patchouli oil, lavandin oil, neroli oil, ylang oil, rose absolute or jasmin absolute; natural resins such as labdanum resin or olibanum resin; single perfumery chemicals which may be isolated from natural sources or manufactured synthetically, as for example alcohols such as geraniol, nerol, citronellol, linalol, tetrahydrogeraniol, betaphenylethyl alcohol, methyl phenyl carbinol, dimethyl benzyl carbinol, menthol or cedrol; acetates and other esters derived from such alcohols-aldehydes such as citral, citronellal, hydroxycitronellal, lauric aldehyde, undecylenic aldehyde, cinnamaldehyde, amyl cinnamic aldehyde, vanillin or heliotropin; acetals derived from such aldehydes; ketones such as methyl hexyl ketone, the ionones and methylionones; phenolic compounds such as eugenol and isoeugenol; synthetic musks such as musk xylene, musk ketone and ethylene brassylate.

In some embodiments, the active agent has a polarity that causes an affinity between the active agent and the channeling agent. An example of such a polar active agent is silica, an absorbing agent that is more compatible with the channeling agent than it is typically with the base polymer. For this reason, during the separating process when the interconnecting channels are formed throughout the entrained polymer, the active agent will congregate toward the channeling agent domains to which it has a greater affinity. In this manner, the channeling agent is permitted to act as a bridge between the vapor located exteriorly to the entrained polymer and the active agent that is located within the entrained polymer. This is particularly true with respect to active agent that is bound within the channeling agent filled passages. In a further embodiment, polar plasticizers such as glycerin may be further added to the mixture, in order to enhance the dispersion or mixing of the active agent into the channeling agent.

It is believed that the higher the active agent concentration in the mixture, the greater the absorption capacity will be of the final composition. However, too high an active agent concentration could cause the entrained polymer to be more brittle and the molten mixture of active agent, base polymer and channeling agent to be more difficult to either thermally form, extrude or injection mold. In one embodiment, the active agent loading level can range from 10% to 80%, preferably 40% to 70%, more preferably from 50% to 70%, and even more preferably from 55% to 65% by weight with respect to the total weight of the entrained polymer.

In one embodiment, the base polymer of the present invention may be a thermoplastic material. Examples of suitable thermoplastic materials include polyolefins such as polypropylene and polyethylene, polyisoprene, polybutadiene, polybutene, polysiloxane, polycarbonates, polyamides, ethylene-vinyl acetate copolymers, ethylene-methacrylate copolymer, poly(vinyl chloride), polystyrene, polyesters, polyanhydrides, polyacrylianitrile, polysulfones, polyacrylic ester, acrylic, polyurethane and polyacetal, or copolymers or mixtures thereof.

In some embodiments, because the entrained polymer 10 of the present invention may be more brittle than other polymeric materials, due to the inclusion of an active agent 30, a package may be molded so that an interior portion of the package is formed of an entrained polymer 10 of the present invention, while the exterior portions are formed from pure polymer or a composition of the present invention with a lower proportion of active agent 30. For example, a package having an interior portion composed of an entrained polymer 10 the present invention and an exterior portion composed of pure polymer, will typically not only be more durable and less brittle, but the pure polymer exterior portion can also act as a vapor barrier that resists the transmission of undesirable vapors from the exterior into the interior of the package. In this manner, the absorption capacity of the absorbing agent 30 is potentiated by exposing it exclusively to the interior of the package from which it is desired that the vapor be withdrawn and retained from.

Figure 4:
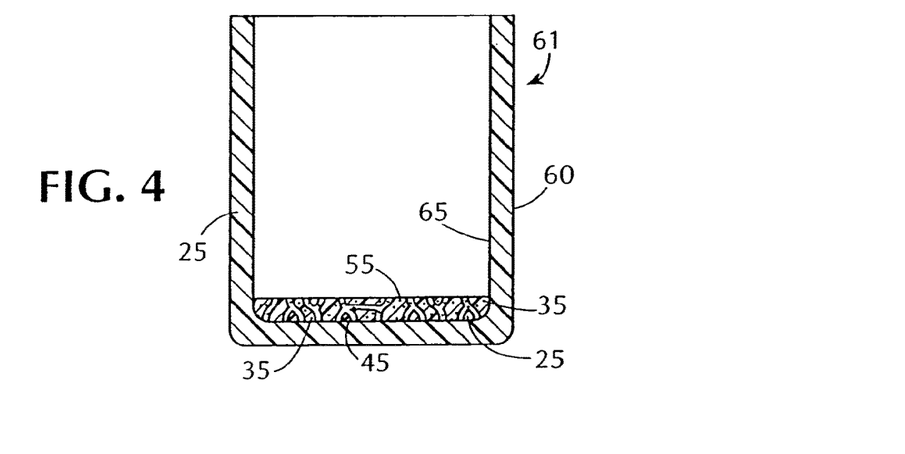
FIG. 4 is a cross section of an active container having an active plug formed of an entrained polymer according to the invention housed therein.
Figure 5:
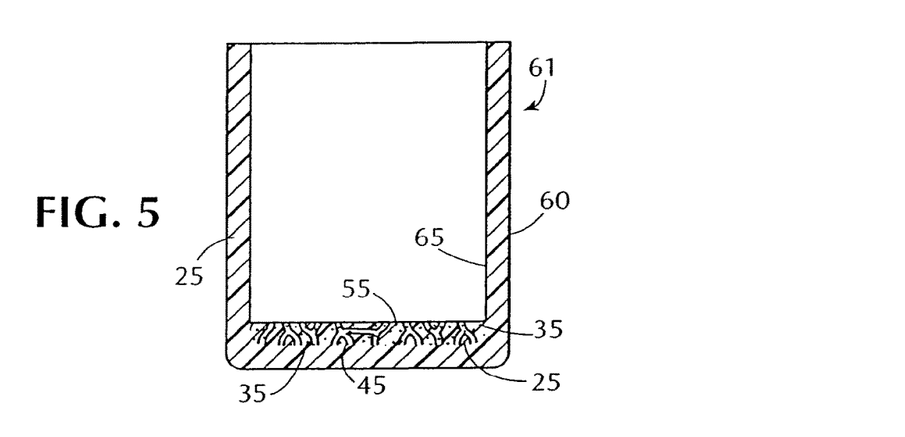
FIG. 5 is a cross section of an active container similar to that of FIG. 4, in which the plug and the container are formed integrally.

The entrained polymer 10 of the present invention has numerous applications. One exemplary application is the construction of rigid containers 61, which are suitable for containing relatively small volumes of product such as foodstuffs and medicines. In many cases, these types of products must be shipped and stored in controlled environments (e.g., reduced moisture and/or oxygen). In an embodiment, the entrained polymer 10 of the present invention may be formed into an insert for inclusion within the interior of the container 61. An example of one form of an insert is a plug 55 of any suitable shape, such as that shown in FIGS. 4 and 5. While the plug 55 would serve its purpose by being merely deposited within the container, it may also be fixed to an interior location so that it does move about within the interior space. The plug 55 may be formed into a disc that is shaped and sized to be press fitted snugly into a receiving location at the bottom of a polymeric container 61, as shown in FIGS. 4 and 5.

In other embodiments, a liner 70 may be formed from the entrained polymer 10 of the present invention, which has an exterior surface substantially conforming to an interior surface of the container body 60. Like the plug 55 described above, the liner 70 may be sized so as to be press-fit into position within the container body 60 where it is held sufficiently snugly to prevent unintended disengagement therefrom. Alternatively, either the plug 55 or liner 70 may be initially constructed and allowed to harden, and then the container body 60 subsequently constructed thereabout so that the greater shrinkage characteristics of the polymeric container body 60 not containing entrained polymer, cause the container body 60 to tightly shrink fit about the plug 55 or liner 70 so that neither becomes easily disengaged from the other. In still a further embodiment, the insert taking the form of either a plug 55 or a liner 70 may be simultaneously co-molded with the container body 60 so that each is integrally joined with the other. In embodiments formed by way of such co-molding, the viscosities of the entrained polymer 10 insert and the container body 60 may be approximately equal to facilitate the proper and desired location of the two phases of liquid or molten material that are molded together.

In yet another embodiment, entrained polymer 10 of the present invention may be used to form an entrained polymer sheet 75 that is joined with another sheet 80. The sheets 75, 80 are effectively laminated one to the other so that sheet 80 can form a substantially gas impermeable exterior layer. The laminate of sheets 75, 80 may then be used to wrap an item which is to be stored in a controlled environment. Sheets 75, 80 could be joined by, for example, thermal extrusion.

Methods of producing entrained polymers 10 according to the present invention include blending a base polymer 25 and a channeling agent 35. The active agent 30 is blended into the base polymer 25 either before or after adding the channeling agent 35. All three components are uniformly distributed within the entrained polymer 10 mixture.

Embodiments of entrained polymers 10 according to the invention may be formed as follows:
  a. The active agent 30 and channeling agent 35 are added to the base polymer 25 when the base polymer 25 is above its melting point and in a molten state. The channeling agent 35 may also be above its melting point and in a molten state at this time.
  b. The molten base polymer 25, active agent 30 and channeling agent 35 are blended and thoroughly mixed to uniformity.

Other embodiments of entrained polymers 10 according to the invention may be formed as follows:
  a. The active agent 30 and channeling agent 35 are added to the base polymer 25 prior to the base polymer 25 reaching its melting point and going into a molten state. The channeling agent 35 may also be in a pre-molten state, prior to reaching its melting point at this time. The mixture of active agent 30, channeling agent 35 and base polymer 35 may be a powder at this time.
  b. The base polymer 25, active agent 30 and channeling agent 35 are blended and thoroughly mixed to uniformity.
  c. The mixture is heated until it reaches the melting point of one or both of the channeling agent 35 and base polymer 25, producing a molten state.

Other embodiments of entrained polymers according to the invention may be formed as follows:
  a. The channeling agent 35 and base polymer 25 are mixed when the base polymer 25 is above its melting point and in a molten state. The channeling agent 35 may also be above its melting point and in a molten state.
  b. The active agent 30 is then added to the channeling agent 35 and base polymer 25 mixture.
  c. The molten base polymer 25, active agent 30 and channeling agent 35 are blended and thoroughly mixed to uniformity.

Other embodiments of entrained polymers 10 according to the invention may be formed as follows:
  a. The channeling agent 35 and base polymer 25 are mixed prior to the base polymer 25 reaching its melting point and going into a molten state. The channeling agent 35 may also be in a pre-molten state, prior to reaching its melting point, at this time.
  b. The active agent 30 is then added to the channeling agent 35 and base polymer 25 mixture.

c. The base polymer 25, active agent 30 and channeling agent 35 are blended and thoroughly mixed to uniformity.

d. The mixture is heated until it reaches the melting point of one or both of the base polymer 25 and channeling agent 35, and goes into a molten state.

Other embodiments of entrained polymers according to the invention can be formed as follows:

a. The channeling agent 35 and base polymer 25 are blended either in a molten state, above the melting point of the base polymer, or in a pre-molten state, prior to reaching the melting point of the base polymer.

b. If blended in a pre-molten state, the mixture is heated above the melting point of the base polymer.

c. The mixture is cooled to solidify.

d. The mixture is immersed in a solution containing the active agent.

In the foregoing example, the active agent 30 is taken up by the composition of base polymer 25 and active agent 35, to form a monolithic composition consisting of at least three phases including the base polymer 25, the channeling agent 35, and the active agent 30. It should be understood that, for purposes of the present invention, immersing includes soaking, coating or other methods that result in an uptake of the active agent 30 by the composition of base polymer 25 and channeling agent 35. This embodiment may be well-suited for materials that are heat-sensitive and thus, that may not be capable of withstanding the temperatures required to melt the channeling agent 35 during processing. Such high temperatures may include, for example, the temperatures incurred during extrusion, which may occur during step d. Consequently, the active agent 30 may be added after extrusion and thus, not subject to high extrusion temperatures, which may detrimentally affect the active agent 30. A further example of this embodiment relates to producing the solution for the active agent 30. In one embodiment, an aqueous solution of the active agent 30 is produced.

After thorough blending and processing as described above, the entrained polymer 30 is cooled, may be formed into a shaped article such as a plug 55 or liner 70, and the channeling agent 35 forms interconnecting channels that act as transmission communicating passages, through which a selected material, such as moisture, oxygen or odor, is transmitted through the entrained polymer 30 between the active agent 30 and the exterior thereof. The entrained polymer 30 may be monolithic, with the base polymer 25, active agent 30 and channeling agent 35 forming a three phase system.

In some embodiments, the components are first dry mixed in a mixer such as a HENSCHEL mixer, and then fed to a compounder. A LEISTRITZ twin screw extruder, for example, or a WERNER PFLEIDER mixer can be used to achieve a good melt mix at about 140 C. to about 170 C. The melt can then be either extruded to form, for example, a film or converted into pellets using dry air cooling on a vibrating conveyer. Where pellets containing channels are formed, they can, for example, then be either injection molded into beads, sieves, or co-injected with polypropylene as the inside layer of a container.

In an embodiment of the present invention, the base polymer 25 may be a water insoluble polymer such as polypropylene maleic anhydride, which may be combined with the channeling agent 35 without the active agent 30. In this embodiment, the maleic anhydride may cause this composition to behave in a similar manner as the three phase system of the present invention, containing interconnecting channels. In another embodiment, an active agent could also be added to the composition described in this paragraph.

In an embodiment, after the entrained polymer 10 of the present invention is produced, some or all of the channeling agent 35 could be removed by conventional means such as, leaching. The resulting entrained polymer 10 may then be capable of transmitting a higher amount of the desired material therethrough. Alternatively, the resulting entrained polymer 10 may then be immersed in a solution containing a desired material and further processed as desired above.

In some embodiments, the entrained polymer 10 of the present invention is used to form a plug 55 for inclusion within a container 61 constructed of a barrier substance. In other embodiments, the entrained polymer 10 of the present invention is used to form a liner 70 for inclusion within a container 61 constructed from a barrier substance. In other embodiments, the entrained polymer 10 of the present invention is used to form an absorption sheet 75. The absorption sheet 75 may optionally be combined with a barrier sheet 80 constructed of a barrier substance for use as a packaging wrap. In other embodiments, the entrained polymer 10 of the present invention is used to form an active insert 20 for a container 61.

Figure 1:
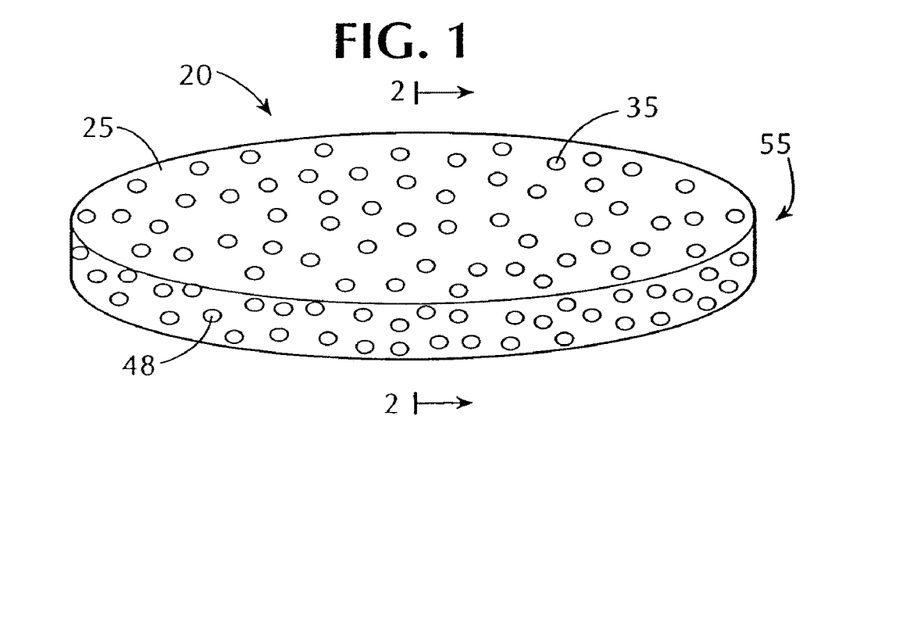
FIG. 1 is a perspective view of an active plug formed of the entrained polymer of the present invention.

Referring to FIG. 1, an insert 20, constructed from the entrained polymer of the present invention is illustrated. The insert 20 is in the form of a plug 55 that may be deposited into a container body 60 (FIG. 5) thereby establishing an active container 61. The container body 60 could be constructed of a barrier substance, for example a gas or moisture impermeable material, which blocks transmission of the selected material therethrough. In such an embodiment, the selected material could be a material to which contact with the product container in the container 61 is undesirable, and the active agent could be an absorbing agent. The combination of the barrier substance container and the active plug minimizes the amount of the selected material within the container 60. In another embodiment, the selected material is a material released by the active agent, which is a releasing material, and the container body is formed of a barrier substance, to help trap the selected material released by the active agent within the container.

A container according to the invention, such as a container formed of a barrier substance as described above, could be molded about the plug 55 so that at least a portion of the plug is exposed to the interior of the container. In another embodiment, the plug 55 is co-molded with the container body 60 so that at least a portion of the plug 55 is exposed to the interior of the container 61.

Figure 2:
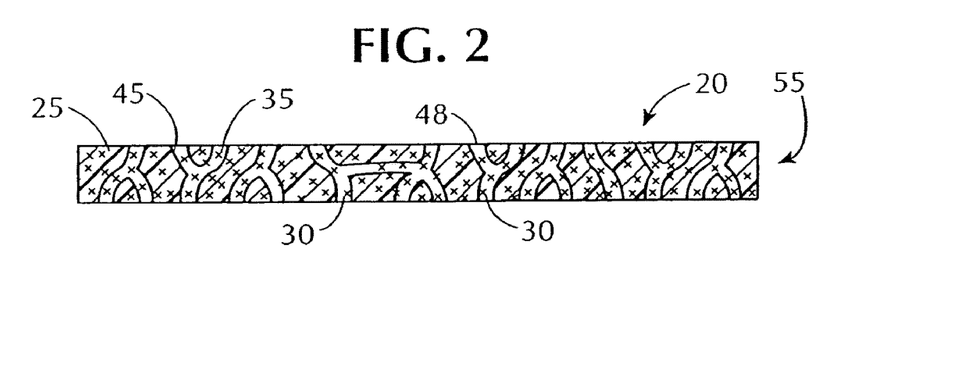
FIG. 2 is a cross section taken along line 2-2 of FIG. 1.

Referring to FIG. 2, a cross-sectional view is shown of the plug 55 that has been constructed from an entrained polymer 10 comprising the base polymer 25 that has been uniformly blended with the active agent 30 and the hydrophilic agent 35. In the illustration of FIG. 2, the entrained polymer of the present invention has been solidified so that interconnecting channels 45 have formed throughout the entrained polymer 10 to establish passages throughout the solidified plug 55. As may be appreciated from both FIGS. 1 and 2, the passages terminate in channel openings 48 at exterior surfaces of the plug 55.

Figure 3:
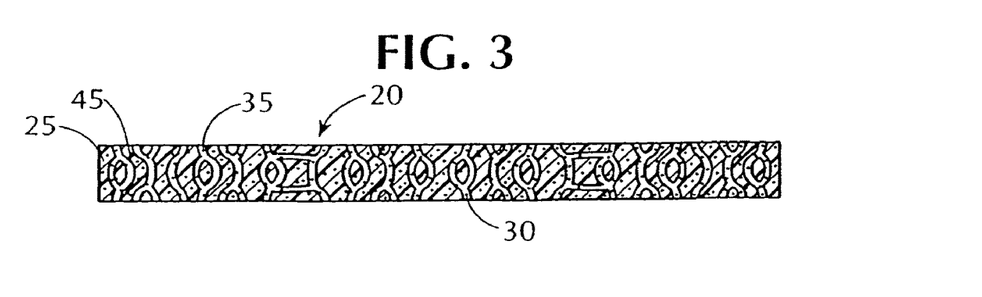
FIG. 3 is a cross section similar to that of FIG. 2, showing an active plug formed of another embodiment of an entrained polymer according to the invention.

FIG. 3 illustrates the embodiment of a plug 55 similar in construction and makeup to the plug 55 of FIG. 2, where interconnecting channels 45 are very fine compared to those of FIG. 2. This can result from the use of a dimer agent (i.e., a plasticizer) together with a channeling agent 35. The dimer agent may enhance the compatibility between the base polymer 25 and the channeling agent 35. This enhanced compatibility is facilitated by a lowered viscosity of the blend, which may promote a more thorough blending of the base polymer 25 and channeling agent 35, which under normal conditions can resist combination into a uniform solution. Upon solidification of the entrained polymer 10 having a dimer agent added thereto, the interconnecting channels 45 which are formed therethrough have a greater dispersion and a smaller porosity, thereby establishing a greater density of interconnecting channels throughout the plug 55.

Interconnecting channels 45, such as those disclosed herein, facilitate transmission of a desired material, such as moisture, gas or odor, through the base polymer 25, which generally resists permeation of these materials, thus acting as a barrier thereto. For this reason, the base polymer 25 itself acts as a barrier substance within which an active agent 30 may be entrained. The interconnecting channels 45 formed of the channeling agent 35 provide pathways for the desired material to move through the entrained polymer 10. Without these interconnecting channels 45, it is believed that relatively small quantities of the desired material would be transmitted through the base polymer 25 to or from the active agent 30. In the case in which the desired material is transmitted to the active agent 30, it may be absorbed by the active agent 30, for example in embodiments in which the active agent 30 is an active agent such as a desiccant or an oxygen absorber. In the case in which the desired material is transmitted from the active agent 30, it may be released from the active agent 30, for example in embodiments in which the active agent 30 is a releasing material, such as a fragrance or gas releasing material.

FIG. 4 illustrates an embodiment of the present invention of a plug 55 which has been deposited into a container body 60, thereby establishing an active container 61. The container body 60 has an interior surface 65 and a plug 55 is affixed thereto, which is constructed substantially from the entrained polymer 10 of the present invention. The container body 60 may be formed of a polymeric or other material that is substantially impermeable to the material transmitted by the interconnecting channels 48 of the entrained polymer 10. For example, the container body 60 could be formed of the same material as that used for the base polymer 25 of the entrained polymer 10. In this manner, the transmitted material is resisted from being transmitted across the walls of the container 61 when the container 61 is closed. As may be seen in FIG. 4, the plug 55 has been press fit into a bottom region of the container 61. It is contemplated that the plug 55 may be merely deposited in the container 61 for loose containment therein, or coupled to the body of the container 61 in a manner that fixes the plug 55 to the container 61. The coupling between the plug 55 and the container 61 is intended to prevent the dislocation and relative movement of the plug 55 within the container 61. This connection may be accomplished by a snug press fit between the plug 55 and the interior surface 65 of the container body 60, or a mechanical connection such as adhesives, prongs, lips or ridges that extend about the plug 55 to hold the plug 55 in place. In yet another embodiment, it is contemplated that the container body 60 may be molded about the plug 55 so that during the curing process of the container body 60, container the body 60 shrinks about the plug 55, thereby causing a shrink-fit to be established between the two components. This type of coupling may also be accomplished in a co-molding process or sequential molding process, in which the plug 55 will have less shrinkage than the polymer 25 comprised container body 60.

FIG. 5 illustrates an active container 61 having the entrained polymer of the present invention formed of a plug 55 located at a bottom location of the container 60, similar to the configuration illustrated in FIG. 4, but differing in that the plug 55 and container body 60 are co-molded so that a unified body 61 is formed with a less distinct interface between the plug 55 and container body 60 components.

Figure 6:
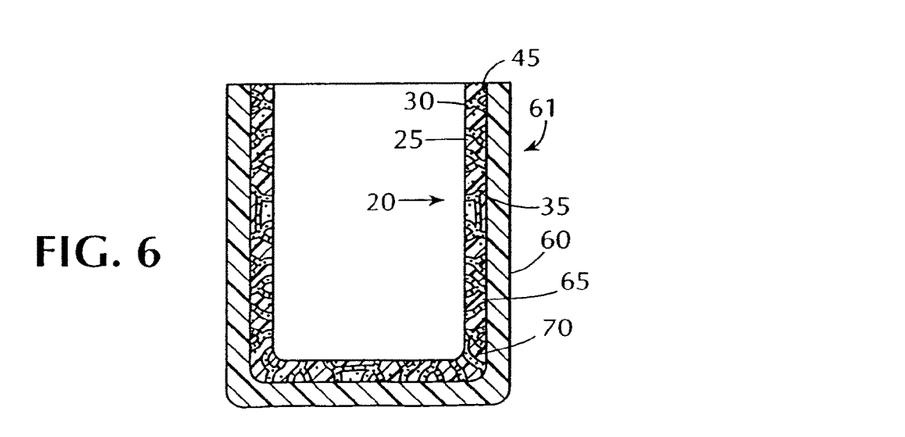
FIG. 6 is a cross section of an active container having a liner formed of an entrained polymer according to the invention.

FIG. 6 illustrates a concept similar to those of FIGS. 4 and 5, in which the proportions of the plug 55 have been extended so that a liner 70 is formed which covers a greater portion of the interior surface 65 of the desiccating container 61. The liner 70 is not localized in the bottom portion of the container body 60, but instead has walls that extend upwardly and cover portions of the walls of the container 61. In such an embodiment, the container body 60 could be formed of a barrier substance, as described above. The container body 60 could be molded about the plug liner 70, or the liner 70 and container body 60 could be co-molded, as described above.

In another embodiment, a liner 70 may be formed from the entrained polymer 10 and then be included within a container 60 constructed from a barrier substance. The liner 70 typically, but not necessarily, has an exterior surface configured for mating engagement with an interior surface 65 of the container 60. The liner 70 may be pressed into mating engagement with the container 60 so that a container 61 is created wherein at least a majority of the interior surface 65 of the container 61 is covered by the liner 70. The liner 70 may be formed from the entrained polymer and then a container 60 constructed from a barrier substance may be molded about the liner 70 so that at least a portion of the liner 70 is exposed to an interior of the container 60 and a majority of an interior surface 65 of the container 60 is covered by the liner 70.

Figure 7:
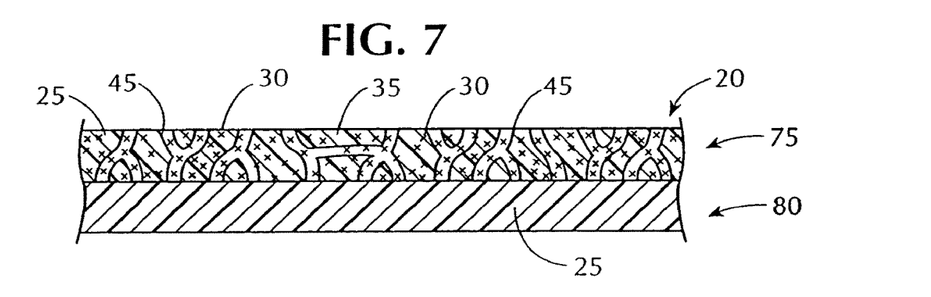
FIG. 7 is a cross sectional view of an active sheet formed of an entrained polymer according to the invention, affixed to a barrier sheet.
Figure 8:
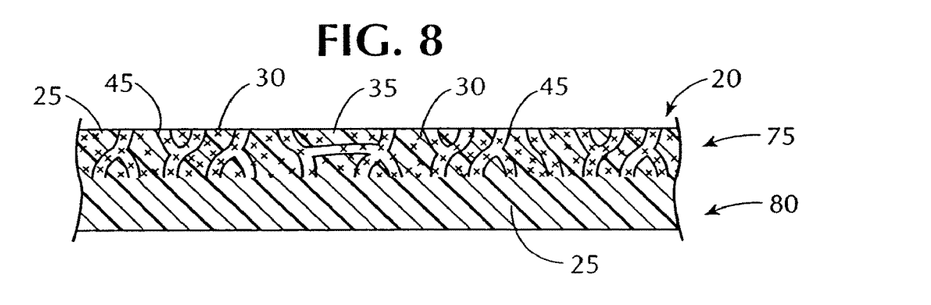
FIG. 8 is a cross sectional view of an active sheet similar to that of FIG. 7, formed integrally with a barrier sheet.

FIGS. 7 and 8 illustrate embodiments of the invention in which an active sheet 75 formed of the entrained polymer 10 of the invention is used in combination with a barrier sheet 80. The characteristics of the active sheet 75 are similar to those described with respect to the plug 55 and liner 70 and container body 60, while the characteristics of the barrier sheet 80 may be similar to the characteristics of the container body 60 described above. Specifically, FIG. 7 illustrates an embodiment in which the two sheets 75, 80 are separately molded, and later combined to form a packaging wrap having active characteristics at an interior surface formed by the entrained polymer 10 active sheet 75, and vapor resistant characteristics at an exterior surface formed by the barrier sheet 80.

FIG. 8 illustrates a co-molded arrangement in which an interface between the active sheet 75 and the barrier sheet 80 is less distinct than in the embodiment of FIG. 7. This product can be produced by a thermal forming process. In such a process, the barrier sheet 80 layer is melted and partially formed into a sheet with the active sheet 75 being deposited on top of the barrier sheet 80 just prior to being pressed or extruded through a slit-like opening in a thermal forming machine.

A laminate structure such as that shown in FIGS. 7 and 8 could also be formed by, for example, suction vacuum molding the barrier sheet 80 with the active sheet 75.

It is also contemplated that the separate sheets 75, 80 of FIG. 7 may be joined together with an adhesive or other suitable means to form a laminate from the plurality of sheets 75, 80. Alternatively, the sheets 75, 80 may be manufactured from a thermal extrusion process whereby both sheets 75, 80 are manufactured at the same time and effectively co-molded together to form the embodiment illustrated in FIG. 8.

In one embodiment, the sheets of FIG. 7 or 8 are joined together to form an active package 85, as shown in FIG. 9. As shown, two laminates are provided, each formed of an active sheet 75 joined with a barrier sheet 80. The sheet laminates are stacked, with the active sheets 75 facing one another, so as to be disposed on an interior of the package, and are joined at a sealing region 90, formed about a perimeter of the sealed region of the package interior. The sheets may be affixed by adhesives, heat sealing, or other means known in the art.

The present invention will be illustrated in greater detail by the following specific examples. It is understood that these examples are given by way of illustration and are not meant to limit the disclosure or claims. For example, although specific relative humidity and temperature values may be provided, the entrained polymer of the present invention is also suited for other conditions. Moreover, these examples are meant to further demonstrate that the present invention has interconnecting channels and that the channeling agents reside in the interconnecting channels. All percentages in the examples or elsewhere in the specification are by weight unless otherwise specified.

EXAMPLE 1

The purpose of the following example is to demonstrate that the entrained polymer of the present invention has interconnecting channels by subjecting films made of the following materials to moisture adsorption testing.

The following samples were prepared:

| Formulation | Raw Material | Raw Material Function | Ratio (% weight) |
|---|---|---|---|
| 1 | Molecular Sieve 4A | Active Agent | 69 |
|   | PEG 4,000 | Channeling Agent | 5 |
|   | Basel HP548N | Base Polymer | 24 |
|   | Colorant Polyone 3113 | Colorant | 2 |
| 2 | Molecular Sieve 4A | Active Agent | 69 |
|   | PEG 20,000 | Channeling Agent | 5 |
|   | Basel HP548N | Base Polymer | 24 |
|   | Colorant Polyone 3113 | Colorant | 2 |
| 3 | Molecular Sieve 4A | Active Agent | 69 |
|   | Lutrol PEO | Channeling Agent | 5 |
|   | Basel HP548N | Base Polymer | 24 |
|   | Colorant Polyone 3113 | Colorant | 2 |
| 4 | Molecular Sieve 4A | Active Agent | 69 |
|   | Polyglykol B01/240 | Channeling Agent | 5 |
|   | Basel HP548N | Base Polymer | 24 |
|   | Colorant Polyone 3113 | Colorant | 2 |
| 5 | Molecular Sieve 4A | Active Agent | 69 |
|   | Basel HP548N | Base Polymer | 29 |
|   | Colorant Polyone 3113 | Colorant | 2 |

In each of the samples listed above, molecular sieve having an aperture size of 4 Å was used as the active agent. Molecular sieve is a moisture and gas absorbing material, which in the case of the materials below, would absorb moisture or gas transmitted through any channels formed in the material. Each sample contains 69% active agent.

Samples 1, 2, 3 and 4 each contain 5% channeling agent. Sample 1 contains PEG 4,000, a polyethylene glycol, which is a channeling agent known in the art. Sample 2 contains PEG 20,000, a polyethylene glycol, which is a channeling agent known in the art. Sample 3 contains Lutrol polyethylene oxide, which is a channeling agent known in the art. Sample 4 contains Polyglykol B01/240, made by CLARIANT, which is a propylene oxide polymerisate-monobutyl ether, which is a channeling agent according to the invention. Sample 5 is a control sample and contains no channeling agent.

Samples 1, 2, 3 and 4 each contain 24% Basel HP548N, a polypropylene, as a base polymer. Sample 5 contains 29% Basel HP548N, a polypropylene, as a base polymer.

Each of the samples contains 2% Colorant Polyone 3113.

Moisture Absorption Testing

Procedure

Each of the samples was subjected to moisture adsorption testing using the following procedure:
a. Parts were accurately weighed on either an analytical or microbalance to determine initial sample weight.
b. Samples were placed into an environmental chamber set to 22 C. and 80% relative humidity and allowed to absorb moisture over time.
c. The samples were re-weighed on a daily basis until no weight gain was measured for three (3) consecutive days. The weights were recorded each day to generate the results graph, shown in FIG. 12.

Results

Figure 12:
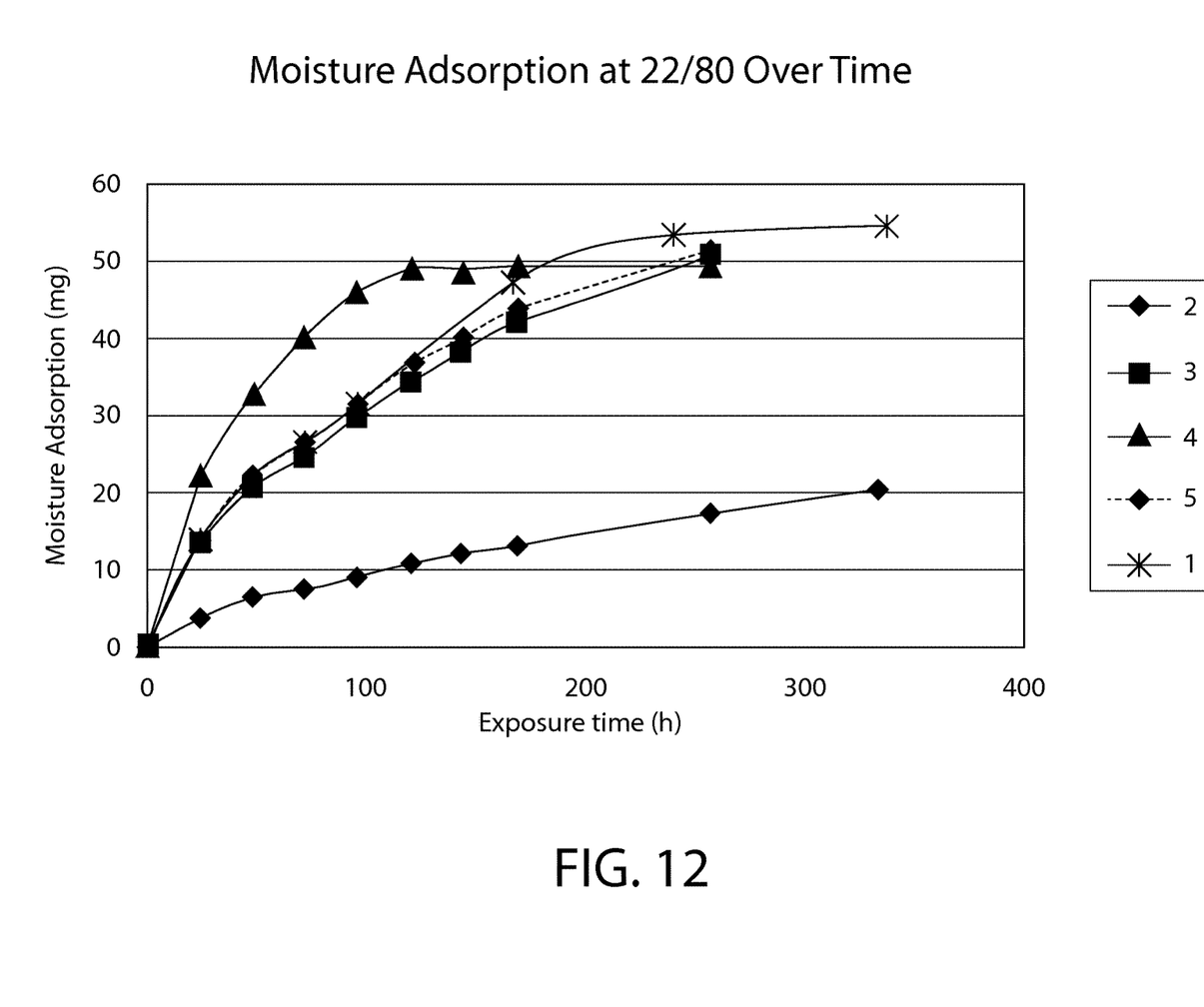
FIG. 12 is a chart showing results of moisture uptake testing of sample films.

The results of the Moisture Uptake Testing are summarized in the graph shown in FIG. 12.

Discussion

As shown in FIG. 12, Sample 4, which includes a channeling agent according to the invention, exhibits greater moisture adsorption capabilities during the first 100 hours of testing, when compared with other samples having the same composition, but with known channeling agents. After 100 hours, the moisture adsorption of Sample 4 slows and then levels off, but the total moisture capacity of Sample 4 after 250 hours of testing is comparable to that of samples using known channeling agents. It is thus believed that propylene oxide polymerisate-monobutyl ether is at least as effective a channeling agent as the polyethylene glycols and polyethylene oxides known in the art. The absorption and capacity of all samples having channeling agents are substantially greater than that of control Sample 5, demonstrating the effectiveness of channeling agents in facilitating moisture absorption. It is believed that the enhanced absorption properties are attributable to moisture being transmitted via channels formed by the channeling agent, which penetrate the base polymer and connect the active agent, in this case molecular sieve desiccant, with the sample exterior.

Extractable Testing

Procedure

Extractable testing was performed in accordance with US Pharmacopoeia standard 661.

Results

The results of extractable testing are summarized in Table 1.

TABLE 1

Weight loss of samples during USP 661 Extractable Testing

| Formulation | Weight loss (g) |
|---|---|
| Sample 2 | 0.020686 |
| Sample 3 | 0.02123 |
| Sample 4 | 0.00805 |

Discussion

As shown in Table 1, the weight loss values found by USP 661 extractable testing of Sample 4, which includes a channeling agent according to the invention, is substantially lower than that of Samples 2 and 3, indicating much lower extractable levels in Sample 4. One possible explanation is the hydrophilic nature of the known channeling agents used in Samples 2 and 3. In contrast, the propylene oxide polymerisate-monobutyl ether is not hydrophilic, and therefore less likely to be extracted from the entrained polymer when exposed to moisture. It is believed that the 0.00805 g of weight loss that does occur in testing of Sample 4 may be attributable to loss of molecular sieve, which is the active agent used in this formulation. Accordingly, the use of a nonextractable active agent in conjunction with the channeling agent of Sample 4 could potentially give rise to a formulation with no extractables.

Monolithic compositions and their constituent compounds have been described herein. As previously stated, detailed embodiments of the present invention are disclosed herein; however, it is to be understood that the disclosed embodiments are merely exemplary of the invention that may be embodied in various forms. It will be appreciated that many modifications and other variations that will be appreciated by those skilled in the art are within the intended scope of this invention as claimed below without departing from the teachings, spirit and intended scope of the invention.

What is claimed is:

1. An entrained polymer composition, comprising:
  a polypropylene base polymer;
  a molecular sieve active agent that acts on, interacts or reacts with a selected material; and
  approximately 2% to 10% of a propylene oxide polymerisate-monobutyl ether channeling agent that is a water insoluble polymer, is immiscible with the base polymer and is adapted to transmit a selected material through the entrained polymer at a faster rate than in solely the base polymer.

2. The entrained polymer composition of claim 1, wherein the propylene oxide polymerisate-monobutyl ether channeling agent has a migration in compliance with United States Pharmacopeia Standard 661 regarding physiochemical tests to plastics and heavy metals and nonvolatile residue in polyethylene containers.

3. The entrained polymer composition of claim 2, wherein weight loss of the entrained polymer found by United States Pharmacopeia Standard 661 regarding physiochemical tests to plastics and heavy metals and nonvolatile residue in polyethylene containers is substantially lower than that of a sample entrained polymer having a sample channeling agent in a weight percentage equivalent to that of the propylene oxide polymerisate-monobutyl ether channeling agent, the sample channeling agent being selected from the group consisting of a polyethylene glycol and a polyethylene oxide.

4. The entrained polymer composition of claim 1, wherein the propylene oxide polymerisate-monobutyl ether channeling agent forms channels throughout the entrained polymer, wherein at least some of the molecular sieve active agent is located within the channels, and the channels are capable of transmitting the selected material between the molecular sieve active agent located within the channels and the exterior of the polymer.

5. The entrained polymer composition of claim 1, wherein the molecular sieve active agent is an absorbing material.

6. The entrained polymer composition of claim 5, wherein the selected material is moisture and the absorbing material absorbs moisture.

7. The entrained polymer composition of any preceding claim 1, wherein the molecular sieve active agent has a polarity that causes an affinity between the molecular sieve active agent and the propylene oxide polymerisate-monobutyl ether channeling agent.

8. The entrained polymer composition of claim 1, wherein the polypropylene base polymer is substantially impermeable to the selected material.

9. The entrained polymer composition of any claim 1, wherein the molecular sieve active agent is present in an amount of approximately 40% to 70%.

10. The entrained polymer composition of claim 1, wherein the polypropylene base polymer is present in an amount of approximately 24% to 60%.

11. A shaped article formed of the entrained polymer composition of claim 1.

12. The shaped article of claim 11, wherein the shaped article is an active sheet.

13. A laminate structure comprising the active sheet of claim 12, comprising a barrier sheet affixed to the active sheet.

14. A package formed of the laminate structure of claim 13, with the active sheet disposed on an interior thereof, and the barrier sheet disposed on an exterior thereof.

* * * * *